(12) United States Patent
Douyou

(10) Patent No.: US 10,120,218 B2
(45) Date of Patent: Nov. 6, 2018

(54) DISPLAY DEVICE AND ILLUMINATION DEVICE

(71) Applicant: Japan Display Inc., Tokyo (JP)

(72) Inventor: Mamoru Douyou, Tokyo (JP)

(73) Assignee: Japan Display Inc., Tokyo (JP)

( * ) Notice: Subject to any disclaimer, the term of this patent is extended or adjusted under 35 U.S.C. 154(b) by 76 days.

(21) Appl. No.: 15/204,136

(22) Filed: Jul. 7, 2016

(65) Prior Publication Data

US 2017/0031187 A1 Feb. 2, 2017

(30) Foreign Application Priority Data

Jul. 31, 2015 (JP) ................................. 2015-152582

(51) Int. Cl.
| | |
|---|---|
| *G02F 1/1343* | (2006.01) |
| *G02F 1/1335* | (2006.01) |
| *G02F 1/13* | (2006.01) |
| *G02F 1/1334* | (2006.01) |
| *F21V 8/00* | (2006.01) |

(52) U.S. Cl.
CPC ........... *G02F 1/1326* (2013.01); *G02B 6/001* (2013.01); *G02F 1/1334* (2013.01); *G02F 1/133615* (2013.01); *G02F 1/134309* (2013.01); *G02F 2001/133601* (2013.01)

(58) Field of Classification Search
CPC .................. G02F 1/1334; G02F 1/1336; G02F 2001/133601; G02F 1/133602; G02F 1/133606; G02F 1/133615
See application file for complete search history.

(56) References Cited

U.S. PATENT DOCUMENTS

| | | | |
|---|---|---|---|
| 2010/0085510 A1 | 4/2010 | Dkuyama et al. | |
| 2010/0165450 A1 | 7/2010 | Dkuyama et al. | |
| 2011/0109663 A1 | 5/2011 | Uchida et al. | |
| 2011/0141551 A1 | 6/2011 | Uchida et al. | |
| 2011/0169877 A1* | 7/2011 | Ishida ................... | G02F 1/1334 345/690 |
| 2011/0242146 A1 | 10/2011 | Uchida et al. | |
| 2012/0257139 A1* | 10/2012 | Shinkai ............. | G02F 1/133615 349/61 |
| 2012/0274867 A1 | 11/2012 | Shinkai et al. | |
| 2013/0229595 A1 | 9/2013 | Shinkai et al. | |
| 2015/0109763 A1 | 4/2015 | Shinkai et al. | |
| 2016/0163271 A1 | 6/2016 | Sakaigawa et al. | |

FOREIGN PATENT DOCUMENTS

| | | |
|---|---|---|
| JP | 2011-222199 A | 11/2011 |
| JP | 2012-234706 A | 11/2012 |

* cited by examiner

*Primary Examiner* — Jessica M Merlin
(74) *Attorney, Agent, or Firm* — K&L Gates LLP

(57) ABSTRACT

A display device according to an aspect of the present invention includes a plurality of sub illumination regions in which switching between a scattering state and a non-scattering state are independently controlled by applying a voltage to a liquid crystal layer. In the sub illumination region, first electrodes for applying the voltage to the liquid crystal layer are aligned, The first electrodes is divided into a plurality of groups in which every or a plurality of first electrodes are electrically connected each other. The sub illumination region includes divided sub illumination regions, in which the switching between the scattering state and the non-scattering state are independently controlled, corresponding to the groups.

17 Claims, 12 Drawing Sheets

DISPLAY DEVICE AND ILLUMINATION DEVICE

CROSS-REFERENCE TO RELATED APPLICATIONS

This application claims priority to Japanese Application No. 2015-152582, filed on Jul. 31, 2015, the contents of which are incorporated by reference herein in its entirety.

BACKGROUND

1. Technical Field

The present disclosure relates to a display device and an illumination device.

2. Description of the Related Art

A display device using a polymer dispersion type liquid crystal panel as a light guide plate of backlight has been known (refer to Japanese Patent Application Laid-open Publication No. 2011-222199). A light source is disposed on an end face of the polymer dispersion type liquid crystal panel. Illumination light emitted from the light source propagates through the polymer dispersion type liquid crystal panel and is emitted from the polymer dispersion type liquid crystal panel. The polymer dispersion type liquid crystal panel is arranged to be opposed to a display panel. The display panel modulates the illumination light emitted from the polymer dispersion type liquid crystal panel and displays an image.

The polymer dispersion type liquid crystal panel includes two substrates including transparent electrodes and a liquid crystal layer sandwiched between the two substrates. Orientation of the liquid crystal layer is controlled by applying a voltage between a pair of electrodes respectively provided on the two substrates. The illumination light propagates through the polymer dispersion type liquid crystal panel while transmitting through the liquid crystal layer and the electrodes.

The polymer dispersion type liquid crystal panel includes a plurality of sub illumination regions, in which, switching between a scattering state where the illumination light is scattered and a non-scattering state where the illumination light is not scattered, are independently controlled. A light quantity of the illumination light to be emitted from each sub illumination region is controlled according to the time for applying the voltage to the liquid crystal layer in each sub illumination region. A drive system of this kind of backlight includes static drive for collectively lighting all the sub illumination regions and scan drive for sequentially lighting the plurality of sub illumination regions. However, it is not easy to accurately control the light quantity of the illumination light to be emitted from the sub illumination region.

For example, the plurality of sub illumination regions are aligned from a side close to the light source to a side far from the light source. When the static drive is performed, since all the sub illumination regions are in the scattering state, a large amount of the illumination light is scattered in the sub illumination region close to the light source, and the light quantity of the illumination light which reaches the sub illumination region far from the light source is reduced. Therefore, in the sub illumination region close to the light source, the time for applying the voltage to the liquid crystal layer is set to be short. In the sub illumination region far from the light source, the time for applying the voltage to the liquid crystal layer is set to be long. However, with this method, there is a possibility that sticking unevenness is generated between the sub illumination regions due to the difference between the times for applying the voltage to the liquid crystal layer. Therefore, it is necessary to perform the drive with an effort to prevent the sticking unevenness.

When the scan drive is performed, the sub illumination regions to be in the scattering state are switched for each divided period in which a unit period (for example, a single frame period) is divided into the number of sub illumination regions. The light quantity of the illumination light to be emitted from the sub illumination region is set according to brightness of the image to be displayed. Therefore, when a dark image is displayed, the time for applying the voltage to the liquid crystal layer is reduced. However, when the time for applying the voltage is more reduced within the originally short divided period, there is a possibility that the response of the liquid crystal layer is insufficient and the target light quantity cannot be obtained.

SUMMARY

A display device according to an aspect of the present invention includes a polymer dispersion type liquid crystal panel, a light source device configured to emit illumination light that is incident to an end face of the polymer dispersion type liquid crystal panel, and a display panel configured to modulate the illumination light which propagates through the polymer dispersion type liquid crystal panel and is dispersed by the polymer dispersion type liquid crystal panel, wherein the polymer dispersion type liquid crystal panel includes a plurality of sub illumination regions, in which, switching between a scattering state where the illumination light is scattered and a non-scattering state where the illumination light is not scattered, are independently controlled by applying a voltage to a liquid crystal layer, in the sub illumination region, a plurality of first electrodes for applying the voltage to the liquid crystal layer are aligned, the plurality of first electrodes are respectively divided into a plurality of groups in which every or a plurality of first electrodes are electrically connected each other, and the sub illumination region includes a plurality of divided sub illumination regions, in which the switching between the scattering state and the non-scattering state are independently controlled, corresponding to the plurality of groups.

An illumination device according to an aspect of the present invention includes a polymer dispersion type liquid crystal panel; and a light source device configured to emit illumination light that is incident to an end face of the polymer dispersion type liquid crystal panel, wherein the polymer dispersion type liquid crystal panel includes a plurality of sub illumination regions, in which, switching between a scattering state where the illumination light is scattered and a non-scattering state where the illumination light is not scattered, are independently controlled by applying a voltage to a liquid crystal layer, in the sub illumination region, a plurality of first electrodes for applying the voltage to the liquid crystal layer are aligned, the plurality of first electrodes are respectively divided into a plurality of groups in which every or a plurality of first electrodes are electrically connected each other, and the sub illumination region includes a plurality of divided sub illumination regions, in which the switching between the scattering state and the non-scattering state are independently controlled, corresponding to the plurality of groups.

DETAILED DESCRIPTION

Figure 1:
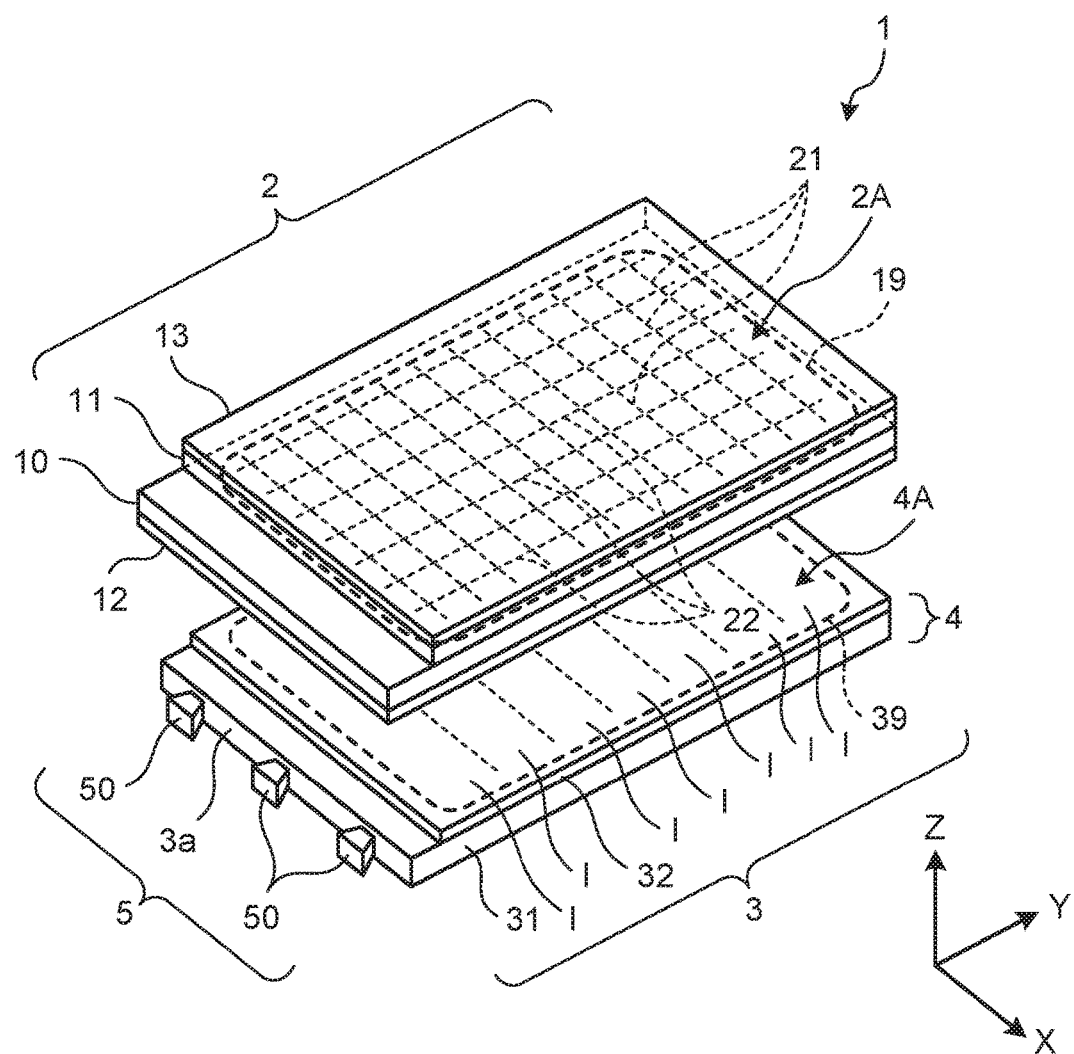
FIG. 1 is a perspective view of an outline structure of a display device according to a first embodiment.

Embodiments according to the present invention will be described in detail with reference to the drawings. The present invention is not limited to a content to be described in the embodiments below. Components to be described below includes a component that a person skilled in the art can easily arrive at and is substantially the same as the components to be described below. In addition, the components to be described below can be appropriately combined. The disclosure is an example. Appropriate changes, which can be easily arrived at by those skilled in the art, made without departing from the scope of the present invention is included in the scope of the invention. For clear description, the drawings may be more schematically expressed regarding the width, the thickness, the shape, and the like of each unit than those in the actual mode. However, the drawings are only exemplary, and the interpretation of the present invention should not be limited to the drawings. In the description and the drawings, the component similar to the one which has been described in the drawing is denoted with the same reference numeral, and detailed description may be appropriately omitted.

First Embodiment

Figure 2:
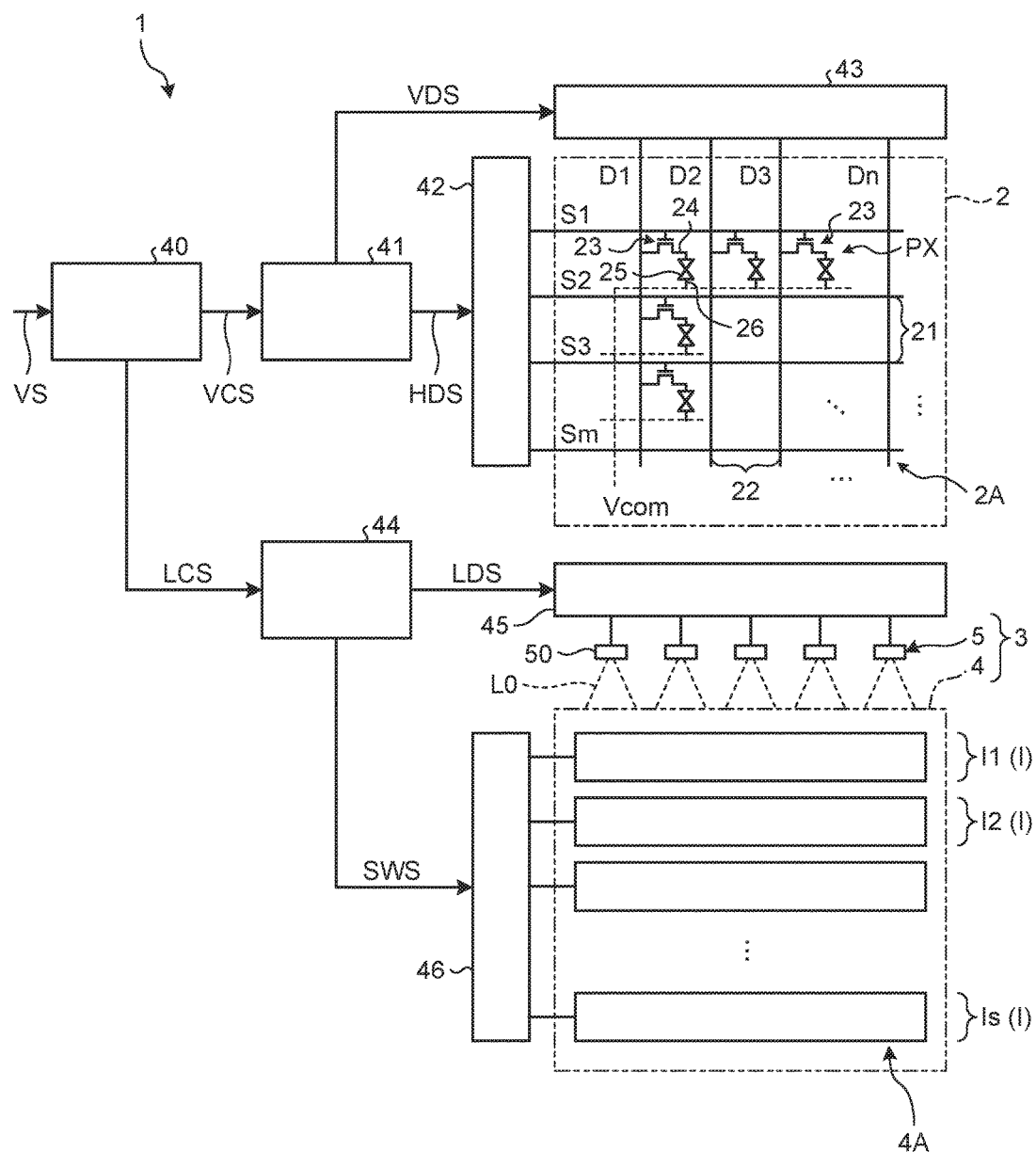
FIG. 2 is a block diagram of an electrical structure of the display device.
Figure 3:
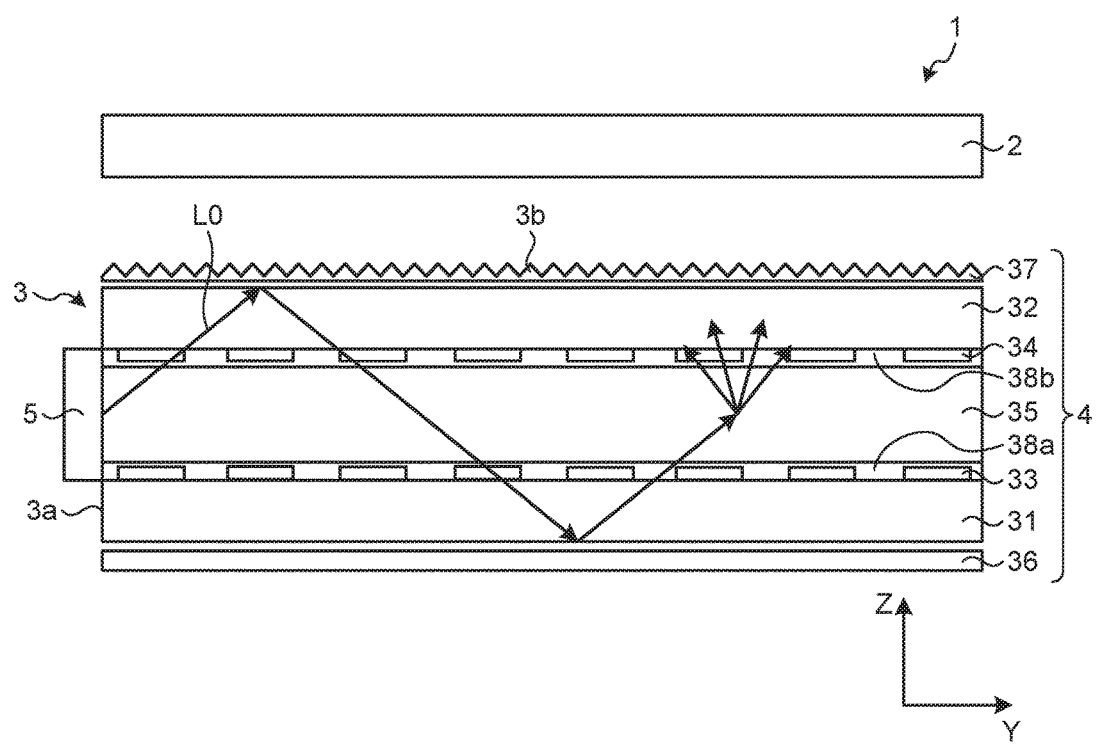
FIG. 3 is a cross sectional view of the outline structure of the display device.

FIG. 1 is a perspective view of an outline structure of a display device 1 according to a first embodiment. FIG. 2 is a block diagram of an electrical structure of the display device 1. FIG. 3 is a cross sectional view of the outline structure of the display device 1. Shapes and arrangements of components will be described below with reference to a XYZ coordinate system.

As illustrated in FIGS. 1 and 2, the display device 1 includes a display panel 2, a backlight (illumination device) 3, an image signal controlling unit 40, a gradation controlling unit 41, a gate line driving unit 42, a data line driving unit 43, a backlight controlling unit (illumination device controlling unit) 44, a light source driving unit 45, and a sub illumination region switching unit 46.

As illustrated in FIG. 1, the display panel 2 includes a first substrate 10, a second substrate 11, a first polarizer 12, and a second polarizer 13. The second substrate 11 is arranged to be opposed to the first substrate 10. A rectangular frame-shaped seal material 19 is provided in a periphery of an opposed region where the first substrate 10 faces to the second substrate 11. A liquid crystal layer 25 (refer to FIG. 2) is sealed in a space surrounded by the first substrate 10, the second substrate 11, and the seal material 19. A display region 2A is provided inside the frame of the seal material 19. The first polarizer 12 is provided on an outer surface side of the first substrate 10. The second polarizer 13 is provided on an outer surface side of the second substrate 11.

As illustrated in FIG. 2, in the display region 2A, a plurality of gate lines 21 extending in an X direction and a plurality of data lines 22 extending in a Y direction are provided in a grid shape as being viewed from a Z direction. A thin film transistor 23 is provided at each intersection part between the gate line 21 and the data line 22. A gate and a source of the thin film transistor 23 are respectively and electrically connected to the gate line 21 and the data line 22. A drain of the thin film transistor 23 is electrically connected to a pixel electrode 24.

A common electrode 26 shared by the pixel electrodes 24 is provided in the display region 2A. A common potential Vcom is supplied to the common electrode 26 by a power supply which is not illustrated. Orientation of the liquid crystal layer 25 is controlled by an electric field generated between the pixel electrode 24 and the common electrode 26. A region where the orientation of the liquid crystal layer 25 is controlled by the single pixel electrode 24 and the common electrode 26 is a single sub-pixel PX. A plurality of the sub-pixels PX arranged in a matrix in the X direction and the Y direction form the display region 2A.

As illustrated in FIG. 3, the backlight 3 is provided on the rear side (opposite side from a side where an image is observed) of the display panel 2. The backlight 3 includes a polymer dispersion type liquid crystal panel 4 and a light source device 5. The polymer dispersion type liquid crystal panel 4 is arranged to be opposed to the display panel 2. The light source device 5 is arranged to be opposed to a first end face 3a of the polymer dispersion type liquid crystal panel 4 extending in the X direction. The first end face 3a opposed to the light source device 5 is a light incident surface. The light source device 5 makes illumination light L0 to be incident to the first end face 3a of the polymer dispersion type liquid crystal panel 4.

As illustrated in FIG. 1, for example, the light source device 5 includes a plurality of light sources 50. The light sources 50 are aligned along the first end face 3a. For example, the plurality of light sources 50 are light emitting diodes (LEDs) which make white illumination light L0 to be incident to the first end face 3a. The light source 50 may be a point-shaped light source such as the LED and an organic electro luminescence (EL) element and a line-shaped light source such as a cold cathode fluorescent lamp (CCFL).

As illustrated in FIG. 3, the polymer dispersion type liquid crystal panel 4 includes a third substrate 31, a fourth substrate 32, a liquid crystal layer 35, a reflection sheet 36, and an optical sheet 37. The third substrate 31 is arranged to be opposed to the fourth substrate 32. A rectangular frame-shaped seal material 39 (refer to FIG. 1) is provided in a periphery of an opposed region where the third substrate 31 faces to the fourth substrate 32. The liquid crystal layer 35 is sealed in a space surrounded by the third substrate 31, the fourth substrate 32, and the seal material 39. The reflection sheet 36 is arranged to be opposed to an outer surface (opposite surface of the liquid crystal layer 35) of the third substrate 31 via an air layer. The optical sheet 37 is arranged to be opposed to an outer surface (opposite surface of the liquid crystal layer 35) of the fourth substrate 32 via an air layer. The optical sheet 37 includes a prism sheet and a diffusion sheet, and the sheets may be stacked.

A plurality of first electrodes 33 extending in the X direction are provided on an inner surface (surface on the side of the liquid crystal layer 35) of the third substrate 31. The first electrodes 33 are aligned in the Y direction. A plurality of second electrodes 34 which are respectively opposed to the plurality of first electrodes 33 are provided on an inner surface (surface on the side of the liquid crystal layer 35) of the fourth substrate 32. The second electrodes 34 are aligned in the Y direction. The first electrode 33 is provided in one-to-one correspondence to the second electrode 34. The first electrode 33 and the second electrode 34 corresponding to each other are arranged in an overlapped state when viewed from the Z direction. The second electrodes 34 are electrically connected to each other and are the common electrode for the plurality of first electrodes 33.

For example, the liquid crystal layer 35 is a reverse mode liquid crystal layer in which liquid crystal is dispersed in a gap of a polymer network formed in a mesh state. Orientation of the liquid crystal layer 35 is controlled by a voltage applied between the first electrode 33 and the second electrode 34. In a state where the voltage is not applied between the first electrode 33 and the second electrode 34, a refractive index of the polymer molecule coincides with that of the liquid crystal, and scattering of the illumination light L0 is not generated in an interface between the polymer molecule and the liquid crystal. In a state where the voltage is applied between the first electrode 33 and the second electrode 34, the refractive index of the polymer molecule is different from that of the liquid crystal, and the scattering of the illumination light L0 is generated in the interface between the polymer molecule and the liquid crystal.

A first orientation film 38a is provided on an inner surface of the third substrate 31, and the plurality of first electrodes 33 are covered with the first orientation film 38a. A second orientation film 38b is provided on an inner surface of the fourth substrate 32, and the plurality of second electrodes 34 are covered with the second orientation film 38b. The liquid crystal layer 35 has contact with the first orientation film 38a and the second orientation film 38b.

Figure 4:
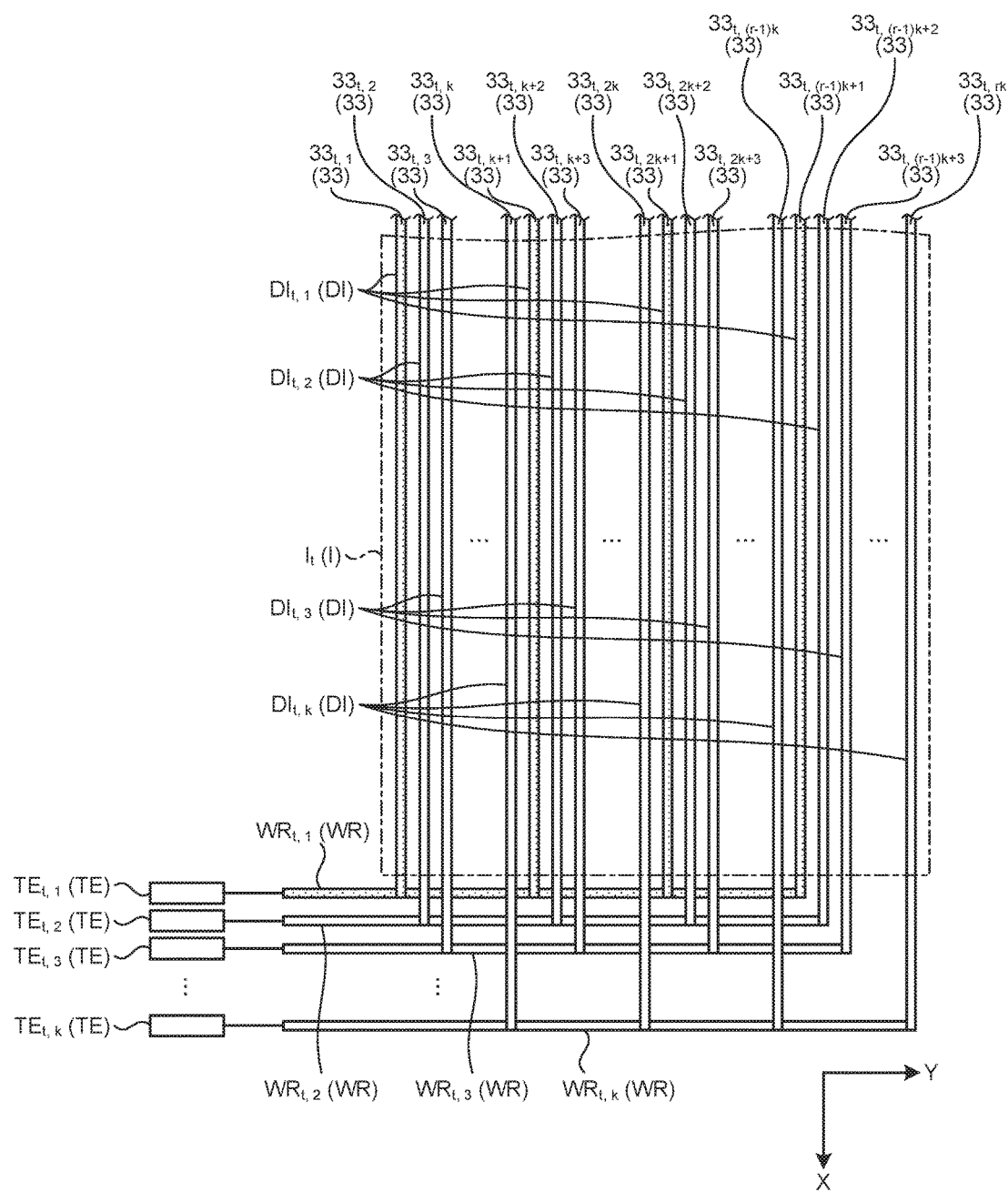
FIG. 4 is a diagram of a structure of a sub illumination region.

FIG. 4 is a diagram of a structure of a single sub illumination region It provided on the polymer dispersion type liquid crystal panel 4.

As illustrated in FIGS. 1 to 3, the polymer dispersion type liquid crystal panel 4 includes a plurality of sub illumination regions I, in which, switching between a scattering state in which the illumination light L0 is scattered and a non-scattering state in which the illumination light L0 is not scattered, are independently controlled by applying the voltage to the liquid crystal layer 35. The sub illumination regions I are aligned along a propagation direction (Y direction) of the illumination light from a side close to the first end face 3a to a side far from the first end face 3a. The sub illumination region It is the sub illumination region I arranged at a t-th position (t is an integer of one or more) from the side close to the first end face 3a. In the example in FIG. 2, the number of sub illumination regions I is s (s is an integer of two or more). The plurality of sub illumination regions I form an illumination region 4A. The illumination region 4A is formed to be substantially the same size as or larger than the display region 2A and is arranged to be opposed to the display region 2A.

As illustrated in FIG. 4, the plurality of first electrodes 33 ($33_{t,1}$ to $33_{t,rk}$) for applying the voltage to the liquid crystal layer 35 (refer to FIG. 3) are aligned in the sub illumination region I (It). In the example in FIG. 4, a strip-shaped region in which the orientation of the liquid crystal layer 35 is controlled by the r×k first electrodes 33 (r is an integer of one or more, and k is an integer of two or more) aligned in the Y direction and r×k second electrodes 34 (refer to FIG. 3) opposed to the r×k first electrodes 33 is a single sub illumination region I.

A plurality of wirings WR ($WR_{t,1}$ to $WR_{t,k}$) extending in a direction intersecting with the first electrodes 33 are provided at the end of the plurality of first electrodes 33. In the example in FIG. 4, the number of wirings WR is k. The r×k first electrodes 33 provided in the single sub illumination region I is electrically connected to the same wiring WR for each r electrodes. The first electrodes 33 are divided into a plurality of (k) groups by causing short circuit between the first electrodes 33 arranged for every or a plurality of first electrodes.

The r first electrodes 33 which belong to the same group are concurrently driven by the same wiring WR. The r first electrodes 33 adjacent to each other are electrically connected to the wiring WR different from each other. The drive of each of the r first electrodes 33 adjacent each other is independently controlled. Terminals TE ($TE_{t,1}$ to $TE_{t,k}$) are respectively provided at the ends of the respective wiring WR. The number of terminals TE is k which is the same as the number of wiring WR.

The sub illumination region I includes a plurality of (k) divided sub illumination regions DI ($DI_{t,1}$ to $DI_{t,k}$) in which switching between the scattering state and the non-scattering state are independently controlled. The divided sub illumination regions DI respectively correspond to the (k) groups. A region in which the orientation of the liquid crystal layer 35 is controlled by the r first electrodes 33 belonging to the same group and the r second electrodes 34 opposed to the r first electrodes 33 is a single divided sub illumination region DI. The divided sub illumination regions DI is provided in one-to-one correspondence to the terminals TE.

The sub illumination region switching unit 46 illustrated in FIG. 2 supplies the voltage to a single or a plurality of terminals TE selected from among the k terminals TE. According to this, a single or a plurality of divided sub illumination regions DI corresponding to the selected single or the plurality of terminals TE are in the scattering state. According to the number of divided sub illumination regions DI to be in the scattering state, an area of a part where the illumination light is emitted (light emitting area) is controlled.

In each sub illumination region I, k terminals TE are provided. The backlight controlling unit 44 illustrated in FIG. 2 individually selects s×k terminals TE and independently controls the scattering state and the non-scattering state of the s×k divided sub illumination regions DI. The backlight controlling unit 44 optionally selects one or a plurality of sub illumination regions I from among the sub illumination regions I and selects one or a plurality of divided sub illumination regions DI from among the divided sub illumination regions DI for each sub illumination region I and differentiate time for applying the voltage to the liquid crystal layer 35 (refer to FIG. 3) according to the number of selected divided sub illumination regions DI. For example, the smaller the number of selected divided sub illumination regions DI is, the longer the time for applying the voltage to the liquid crystal layer 35 (refer to FIG. 3) is.

The single sub illumination region It is illustrated in FIG. 4. However, the structure of other sub illumination regions I provided in the illumination region 4A is the same as that of the sub illumination region It. In the present embodiment, all the sub illumination regions I have an equal number of divided sub illumination regions DI. All the divided sub illumination regions DI have an equal number of the first electrodes 33. All the widths and lengths of the first electrodes 33 provided in the illumination region 4A are equal to each other. However, the structure of the illumination region 4A is not limited to this. For example, the number of divided sub illumination regions DI provided in the single sub illumination region I may be different for each sub illumination region I. The number, the widths, or the lengths of the first electrodes 33 provided in the single sub illumination region I or the divided sub illumination regions DI may be different for each sub illumination region I or divided sub illumination regions DI. The widths or the lengths of the first electrodes 33 provided in the same divided sub illumination region DI may be different according to the position of the first electrode 33.

As illustrated in FIG. 3, the illumination light L0 is emitted from a principal surface of the polymer dispersion type liquid crystal panel 4 (outer surface of the optical sheet 37) opposed to the display panel 2. The principal surface of the polymer dispersion type liquid crystal panel 4 opposed to the display panel 2 is a light emitting surface 3b of the backlight 3. The display panel 2 modulates the illumination light L0 which has propagated through the polymer dispersion type liquid crystal panel 4 and dispersed by the polymer dispersion type liquid crystal panel 4.

The drive of the display panel 2 and the backlight 3 is controlled by the image signal controlling unit 40, the gradation controlling unit 41, the gate line driving unit 42, the data line driving unit 43, the backlight controlling unit 44, the light source driving unit 45, and the sub illumination region switching unit 46 illustrated in FIG. 2.

The image signal controlling unit 40 generates an image control signal VCS and a backlight control signal (illumination device control signal) LCS based on an image signal VS input from outside. The image signal VS includes gradation information on a gradation value of each sub-pixel PX. The gradation value regarding the gradation information included in the image signal VS is referred to as an input gradation value.

The backlight control signal LCS is a signal to instruct a light quantity of the illumination light L0 emitted from each sub illumination region I and to emit the illumination light L0 from each sub illumination region I at a predetermined timing. The light quantity of the illumination light L0 is set according to image brightness of a display part of the display panel 2 corresponding to the sub illumination region I in the scattering state (for example, an average input gradation value of sub-pixels PX included in the display part). For example, in a part where a dark image is displayed, the light quantity of the illumination light L0 emitted from the sub illumination region I is set to be small. In a part where a bright image is displayed, the light quantity of the illumination light L0 emitted from the sub illumination region I is set to be large. According to this, power consumption is more reduced and contrast is more improved than those in a case where the whole display region 2A of the display panel 2 is constantly irradiated with the illumination light L0 having the maximum light quantity.

The image control signal VCS is a signal to determines the gradation value to be applied to each sub-pixel PX of the display panel 2. The image control signal VCS includes the gradation information on the gradation value of each sub-pixel PX. The gradation value regarding the gradation information included in the image control signal VCS is referred to as an output gradation value. The image signal controlling unit 40 sets the output gradation value by applying correction processing such as gamma correction and expansion processing to the input gradation value.

The gradation controlling unit 41 generates a horizontal drive signal HDS and a vertical drive signal VDS based on the image control signal VCS. The gate line driving unit 42 selects the plurality of gate lines 21 of the display panel 2 in a single vertical scanning period based on the horizontal drive signal HDS. The order may be arbitrary selected. For example, the plurality of gate lines 21 are sequentially selected in an order of S1, S2, S3, . . . , and Sm. The data line driving unit 43 supplies a gradation signal according to the output gradation value of each sub-pixel PX to the plurality of data lines 22 of the display panel 2 in a single horizontal scanning period based on the vertical drive signal VDS. According to this, the display panel 2 modulates the illumination light L0 which has propagated through the polymer dispersion type liquid crystal panel 4 and dispersed by the polymer dispersion type liquid crystal panel 4 based on the image control signal VCS and displays an image for one frame.

The backlight controlling unit 44 generates a light source drive signal LDS and a sub illumination region switching signal SWS based on the backlight control signal LCS. The light source drive signal LDS indicates the light quantity and the irradiation timing of the light to be emitted from each light source 50. The sub illumination region switching signal SWS is a signal to set the timing when the state of each sub illumination region I is changed to be the scattering state and to set the divided sub illumination region DI to be selected in each sub illumination region I.

The sub illumination region switching unit 46 concurrently or sequentially selects one or a plurality of sub illumination regions I from among the polymer dispersion type liquid crystal panel 4 in the single vertical scanning period based on the sub illumination region switching signal SWS. The sub illumination region switching unit 46 concurrently selects one or a plurality of divided sub illumination regions DI from among the divided sub illumination regions DI in each of the selected one or the plurality of sub illumination regions I and changes the state of the region to the scattering state. The light source driving unit 45 makes each light source 50 emit the light having the specified light quantity in the single horizontal scanning period based on the light source drive signal LDS. Accordingly, the illumination light L0 of the light quantity controlled by the light source driving unit 45 is emitted from the selected one or the plurality of sub illumination regions I to the display panel 2.

For example, when scan drive for scanning the illumination light L0 in the vertical direction according to the write of the image is performed, the sub illumination region switching unit 46 sequentially selects the plurality of sub illumination regions I of the polymer dispersion type liquid crystal panel 4 in an order of I1, I2, I3, I4, ..., and Is from the upper side sub illumination region in the single vertical scanning period based on the sub illumination region switching signal SWS. The sub illumination region switching unit 46 concurrently selects one or the plurality of divided sub illumination regions DI from among the divided sub illumination regions DI in each of the selected sub illumination regions I and changes the state of the selected region to the scattering state. The light source driving unit 45 makes each light source 50 emit the light having the specified light quantity in the single horizontal scanning period based on the light source drive signal LDS. Accordingly, the illumination light L0 having the light quantity controlled by the light source driving unit 45 is sequentially emitted from the plurality of sub illumination regions I to the display panel 2.

The illumination light L0 emitted from the light source device 5 propagates through the polymer dispersion type liquid crystal panel 4 in the Y direction and is emitted from the sub illumination region I in the scattering state. The illumination light L0 emitted from the sub illumination region I is modulated by the display panel 2 and displayed as an image having the size corresponding to the sub illumination region I. The positions of the sub illumination regions I in the scattering state are sequentially changed so that an image for one screen is displayed.

When static drive for collectively lighting all the illumination regions 4A is performed, the sub illumination region switching unit 46 concurrently selects all the sub illumination regions I of the polymer dispersion type liquid crystal panel 4 in the single vertical scanning period based on the sub illumination region switching signal SWS. The sub illumination region switching unit 46 concurrently selects one or the plurality of divided sub illumination regions DI from among the divided sub illumination regions DI in each of the selected sub illumination regions I and changes the state of the selected region to the scattering state. The light source driving unit 45 makes each light source 50 emit the light having the specified light quantity in the single horizontal scanning period based on the light source drive signal LDS. Accordingly, the illumination light L0 having the light quantity controlled by the light source driving unit 45 is emitted from the plurality of sub illumination regions I to the display panel 2.

The illumination light L0 emitted from the light source device 5 propagates through the polymer dispersion type liquid crystal panel 4 in the Y direction, and all the sub illumination regions I concurrently emit the illumination light L0. The illumination light L0 emitted from each sub illumination region I is modulated by the display panel 2 and displayed as an image having the size corresponding to the sub illumination region I. Accordingly, the image for one screen is displayed.

Figure 5:
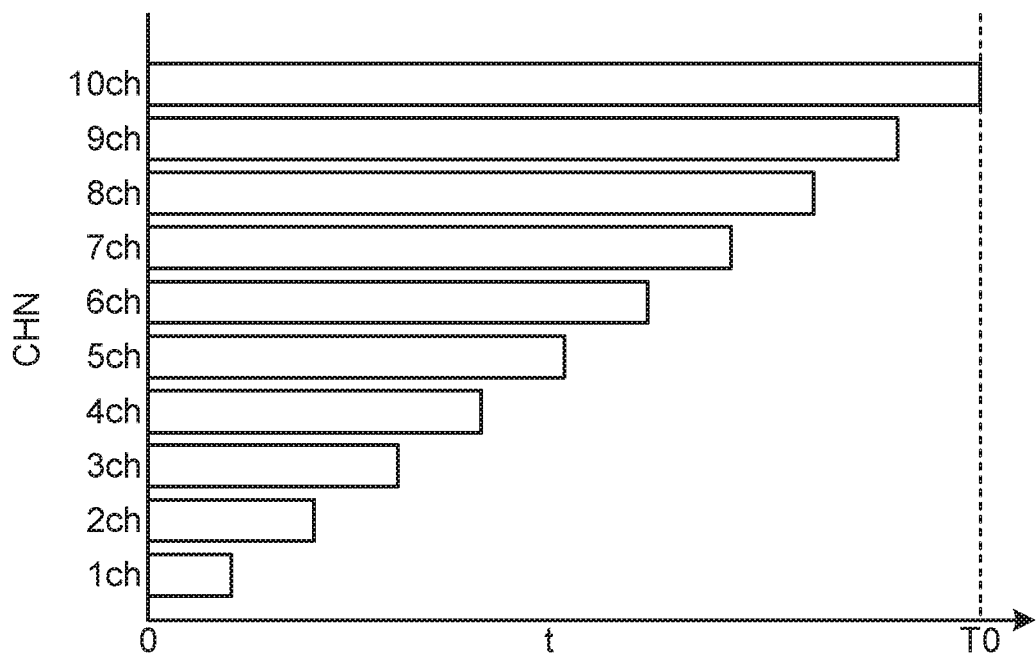
FIG. 5 is a diagram to describe static drive according to a comparative example.
Figure 6:
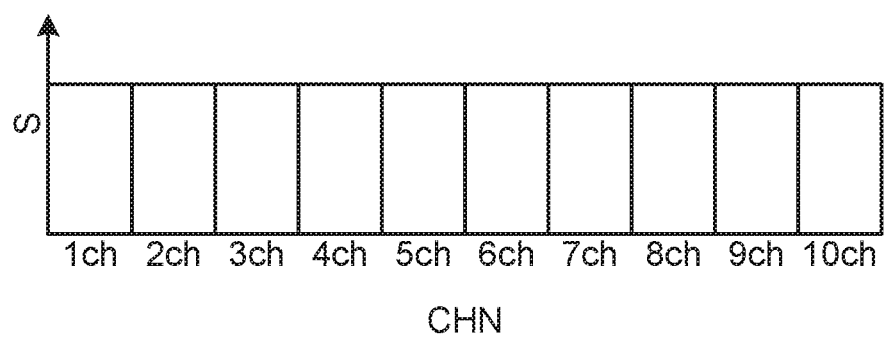
FIG. 6 is a diagram to describe the static drive according to the comparative example.
Figure 7:
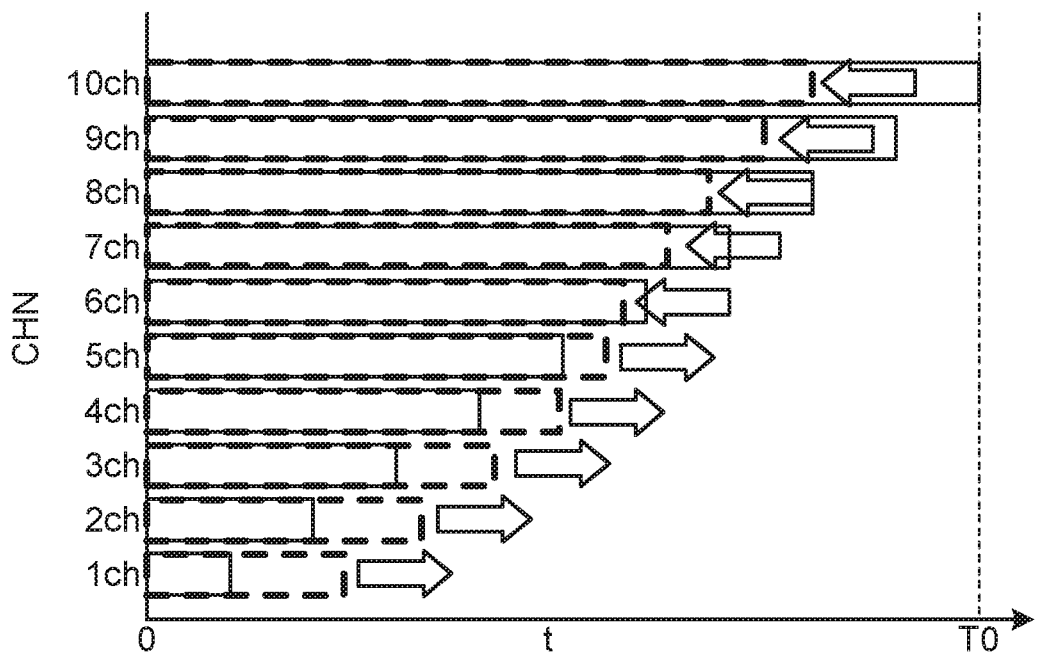
FIG. 7 is a diagram of static drive according to the present embodiment.

FIGS. 5 to 7 are diagrams to describe the static drive. The static drive is a driving system in which all the sub illumination regions I provided in the illumination region 4A (refer to FIG. 2) are concurrently in the scattering state and all the illumination regions 4A are collectively lighted. For example, in FIGS. 5 to 7, the number of the sub illumination regions provided in the illumination region is assumed to be 10, and the sub illumination regions are denoted with the reference numerals "1ch", "2ch", "3ch", ..., and "10ch" from the sub illumination region closer to the first end face 3a (refer to FIG. 3) which is the light entering part. The present example corresponds to a case where it is assumed that s is 10 in FIG. 2. The sub illumination regions of "1ch", "2ch", "3ch", ..., and "10ch" respectively correspond to the sub illumination regions I1, I2, I3, ..., and I10.

Figure 8:
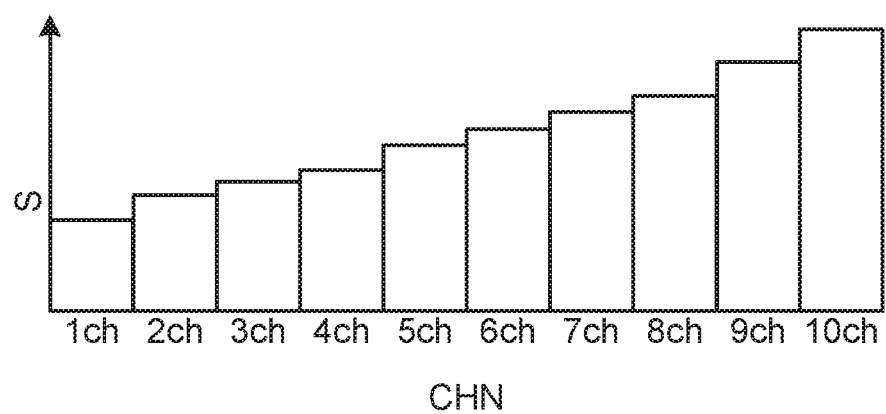
FIG. 8 is a diagram of the static drive according to the present embodiment.

FIGS. 5 and 6 are diagrams of the static drive according to a comparative example in which the sub illumination region I is not divided into the plurality of divided sub illumination regions DI. FIGS. 7 and 8 are diagrams of the static drive according to the present embodiment in which the sub illumination region I is divided into the plurality of divided sub illumination regions DI. In FIGS. 5 and 7, the vertical axis indicates a number CHN of the sub illumination region I, and the horizontal axis indicates a time tin a unit period T0 (for example, a single frame period). The length of a horizontal bar extending in a time axis direction indicates a time for applying the voltage to the liquid crystal layer 35. In FIGS. 6 and 8, the horizontal axis indicates the number CHN of the sub illumination region I, and the vertical axis indicates an area of the liquid crystal layer 35 to be in the scattering state (light emitting area S).

As illustrated in FIG. 6, in the comparative example, the sub illumination region I is not divided into the plurality of divided sub illumination regions DI. Therefore, all the sub illumination regions I have equal light emitting areas S. The illumination light is propagated from the sub illumination region I of 1ch to the sub illumination region I of 10ch. Therefore, the light quantity of the illumination light for entering the sub illumination region I is larger in the sub illumination region I closer to the light entering part and smaller in the sub illumination region I far from the light entering part. In the sub illumination region I close to the light entering part, even when the time for applying the voltage to the liquid crystal layer 35 (refer to FIG. 3) (time to be in the scattering state) is short, the illumination light having a sufficient light quantity is emitted to the display panel 2. In the sub illumination region I far from the light entering part, the illumination light having the sufficient light quantity is not emitted to the display panel 2 without lengthening the time for applying the voltage to the liquid crystal layer 35. Therefore, for uniform illumination to the whole illumination region 4A, as illustrated in FIG. 5, when the distance between the light entering part and the sub illumination region I gets longer, it is necessary to lengthen the time for applying the voltage to the liquid crystal layer 35. However, with this method, there is a possibility that sticking unevenness is generated between the sub illumination regions I due to the difference between the times for applying the voltage to the liquid crystal layer 35.

As illustrated in FIG. 8, in the present embodiment, the sub illumination region I is divided into the plurality of divided sub illumination regions DI. Therefore, the light emitting area S is different according to the number of selected divided sub illumination regions DI. In the present embodiment, the closer to the light entering part the sub illumination region I is, the smaller the number of selected divided sub illumination regions DI is. The farther from the light entering part the sub illumination region I is, the larger the number of selected divided sub illumination regions DI is. Therefore, the closer to the light entering part the sub illumination region I is, the smaller the light emitting area S is. The farther from the light entering part the sub illumination region I is, the larger the light emitting area S is. As illustrated in FIG. 7, in the present embodiment, for the uniform illumination to the whole illumination region 4A, the time for applying the voltage to the liquid crystal layer 35 in the sub illumination region I close to the light entering part is longer than that of the comparative example, and the time for applying the voltage to the liquid crystal layer 35 in the sub illumination region I far from the light entering part is shorter than that of the comparative example. Therefore, the time for applying the voltage to the liquid crystal layer 35 is equalized in all the sub illumination regions I.

FIGS. 9 to 12 are diagrams to describe the scan drive. The scan drive is a driving system which sequentially changes the state of the plurality of sub illumination regions I provided in the illumination region 4A to the scattering state and sequentially lights the plurality of sub illumination regions I while controlling the time to be the scattering state (the light quantity of the illumination light emitted from the sub illumination region I to the display panel 2) for each sub illumination region I.

Figure 9:
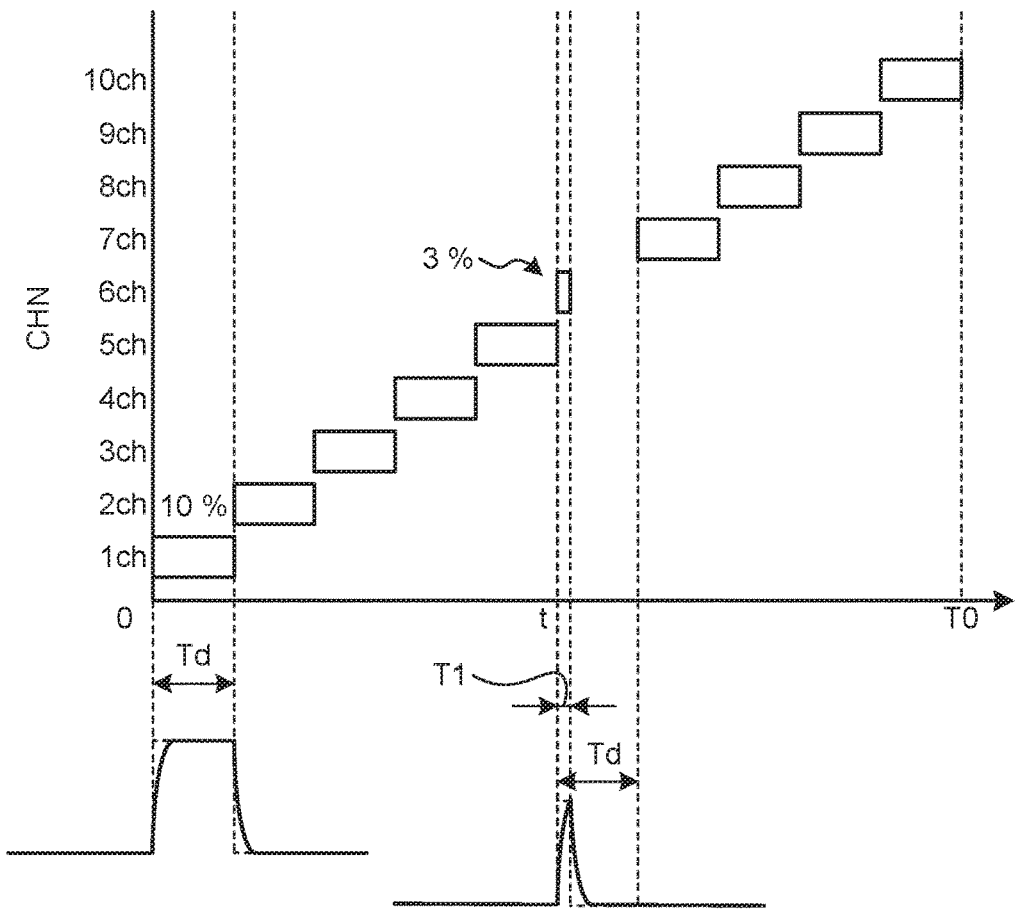
FIG. 9 is a diagram to describe scan drive according to the comparative example.
Figure 10:
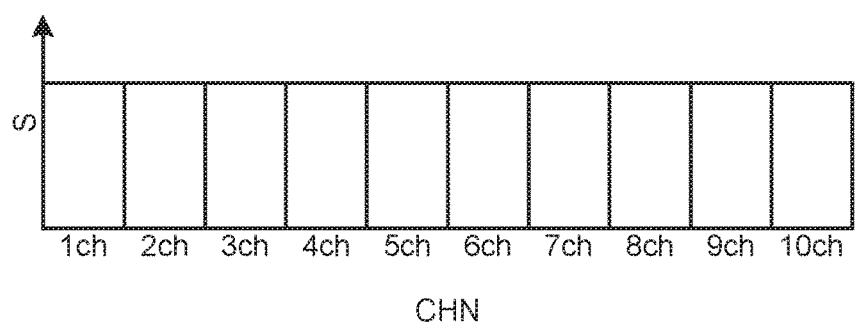
FIG. 10 is a diagram to describe the scan drive according to the comparative example.
Figure 11:
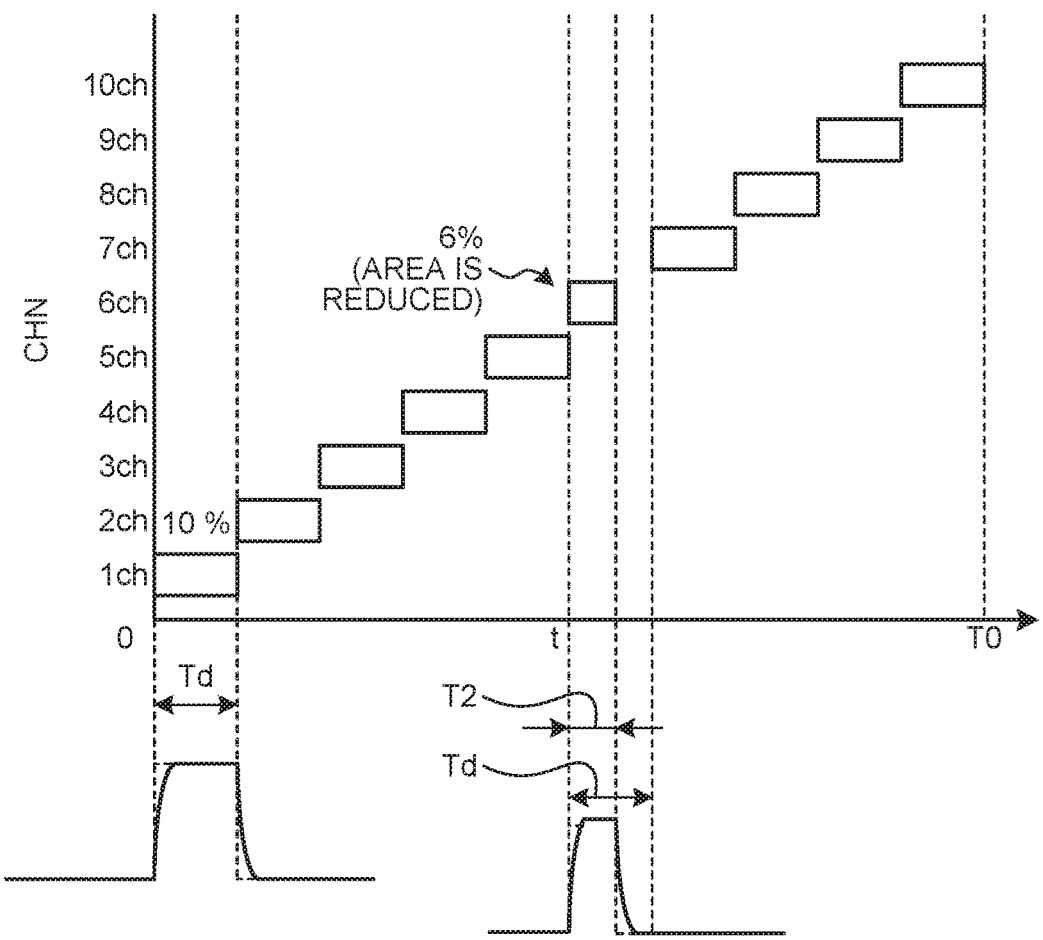
FIG. 11 is a diagram to describe scan drive according to the present embodiment.
Figure 12:
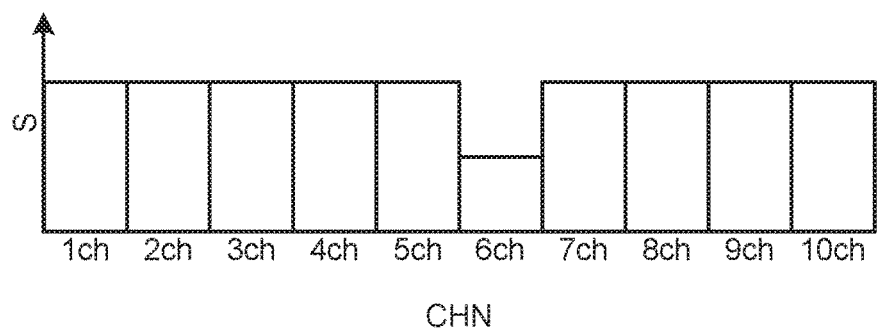
FIG. 12 is a diagram to describe the scan drive according to the present embodiment.

FIGS. 9 and 10 are diagrams to describe the scan drive according to the comparative example in which the sub illumination region I is not divided into the plurality of divided sub illumination regions DI. FIGS. 11 and 12 are diagrams to describe the scan drive according to the present embodiment in which the sub illumination region I is divided into the plurality of divided sub illumination regions DI. FIGS. 9 to 12 respectively correspond to FIGS. 5 to 8. The diagrams on the lower side of FIGS. 9 and 11 indicate a scattering intensity of the liquid crystal layer 35.

As illustrated in FIG. 9, in the scan drive, the sub illumination regions I to be in the scattering state are switched for each divided period Td in which the unit period T0 (for example, a single frame period) is divided into the number of sub illumination regions I. The time for applying the voltage to the liquid crystal layer 35 is set within a range of the divided period Td. For example, when it is assumed that the unit period T0 is 16.7 ms (a single frame period in a case where the image is rewritten at 60 Hz) and that the number of sub illumination regions I is 10, the divided period Td is 1.67 ms (10% of the unit period T0). The light quantity of the illumination light emitted from the sub illumination region I is set according to the brightness of the image in the display part of the display panel 2 corresponding to the sub illumination region I. Therefore, the time for applying the voltage to the liquid crystal layer 35 is set according to the brightness of the image.

For example, in FIG. 9, the light quantity of the illumination light in the sub illumination region I of 6ch is set to be small. As illustrated in FIG. 10, in the comparative example, all the sub illumination regions I have equal light emitting areas S. Therefore, when the light quantity of the illumination light is reduced, it is necessary to reduce the time for applying the voltage to the liquid crystal layer 35. However, when the time for applying the voltage is more reduced in the originally short divided period Td, there is a possibility that the response of the liquid crystal layer 35 is insufficient and the target light quantity cannot be obtained.

For example, as illustrated in the diagram on the lower side of FIG. 9, when the illumination is performed over full divided period Td (10% of the unit period T0), the illumination is performed in a state where the liquid crystal layer 35 is sufficiently oriented. However, when the illumination is performed in a very short period T1 (for example, 3% of the unit period T0) in the divided period Td, the illumination is performed in a state where the orientation of the liquid crystal layer 35 is not sufficient. Therefore, when the light quantity of the illumination light is estimated in consideration of the time for applying the voltage to the liquid crystal layer 35, according to the calculation, 30% of the light quantity should be obtained compared with a case where the voltage is applied to the liquid crystal layer 35 over the full divided period Td (10% of the unit period T0). However, since the scattering of the liquid crystal layer 35 is actually insufficient, only the light quantity smaller than 30% of the target light quantity is obtained. Especially, in the polymer dispersion type liquid crystal panel, since the liquid crystal is strongly anchored by the surrounding polymer molecule, a response speed of the liquid crystal layer 35 is slow. Therefore, a gap with the light quantity estimated by the calculation easily becomes large.

As illustrated in FIG. 12, in the present embodiment, the light emitting area S is different according to the number of selected divided sub illumination regions DI. The number of divided sub illumination regions DI to be selected is set according to the brightness of the image in the display part of the display panel 2 corresponding to the sub illumination region I. For example, in the sub illumination region I of 6ch, the number of selected divided sub illumination regions DI is small, and the light emitting area S is small. As illustrated in FIG. 11, in the sub illumination region I of 6ch, a time T2 for applying the voltage to the liquid crystal layer 35 is lengthened than that in the comparative example so as to obtain the target light quantity of the illumination light in the sub illumination region I of 6ch. Therefore, the illumination is performed in a state where the liquid crystal layer 35 is sufficiently oriented. Accordingly, the target light quantity can be easily obtained.

Figure 13:
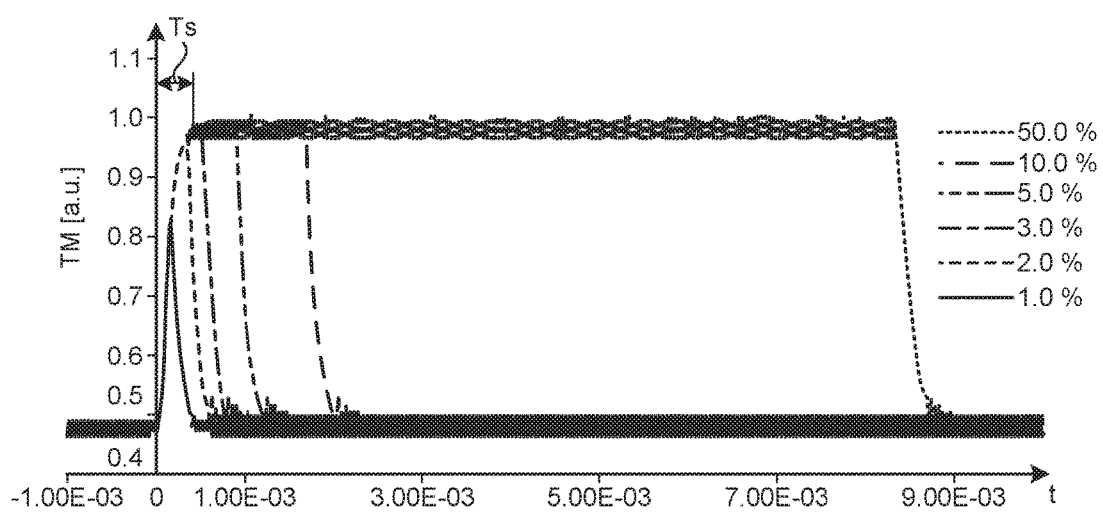
FIG. 13 is a diagram of a relation between time for applying a voltage to a liquid crystal layer and a light quantity of illumination light which is scattered in a liquid crystal layer and emitted outward a polymer dispersion type liquid crystal panel.

FIG. 13 is a diagram of a relation between the time t for applying the voltage to the liquid crystal layer 35 and a light quantity TM of the illumination light dispersed by the liquid crystal layer 35 and emitted outward the polymer dispersion type liquid crystal panel. A value indicated in the explanatory note on the right side of FIG. 13 indicates a rate of the time for applying the voltage based on the unit period T0 (16.7 ms).

As illustrated in FIG. 13, the light quantity TM is saturant when the time for applying the voltage to the liquid crystal layer 35 exceeds a time Ts. The time Ts is a time from the application of the voltage to the liquid crystal layer 35 to the completion of the orientation change of the liquid crystal layer 35. In the example in FIG. 13, the time Ts corresponds to 3% of the unit period T0. The backlight controlling unit 44 illustrated in FIG. 2 sets a light quantity M1 of the illumination light to be emitted from the sub illumination region I based on the brightness of the image displayed on the display panel 2. Also, the backlight controlling unit 44 calculates the time for applying the voltage to the liquid crystal layer 35 necessary for obtaining the light quantity M1 when illumination is performed as changing the states of all the divided sub illumination regions DI in the sub illumination region I to the scattering state as a target time. In a case where the target time is equal to or shorter than the time Ts from the application of the voltage to the liquid crystal layer 35 to the completion of the orientation change of the liquid crystal layer 35, the polymer dispersion type liquid crystal panel 4 is controlled so that the divided sub illumination regions DI, of which the number is less than the number k of divided sub illumination regions DI provided in the sub illumination region I, are in the scattering state.

As described above, in the display device 1 according to the present embodiment, the light quantity of the illumination light L0 emitted from the sub illumination region I is controlled according to the number of divided sub illumination regions DI to be selected. When the static drive is performed, the number of divided sub illumination regions DI to be selected in the sub illumination region I close to the light entering part is different from that in the sub illumination region I far from the light entering part. Therefore, the time for applying the voltage to the liquid crystal layer 35 in the sub illumination region I close to the light entering part is equalized to that in the sub illumination region I far from the light entering part. Accordingly, the light quantity of the illumination light L0 emitted from the sub illumination region I can be accurately controlled while reducing the sticking unevenness. When the scan drive is performed, the number of divided sub illumination regions DI to be selected and the time for applying the voltage to the liquid crystal layer 35 are appropriately controlled according to the light quantity of the illumination light L0 to be emitted. Therefore, the illumination is performed in a state where the liquid crystal layer 35 is sufficiently oriented. Therefore, even when the light quantity of the illumination light to be emitted from the sub illumination region I is small, the target light quantity of the illumination light is easily obtained.

Second Embodiment

Figure 14:
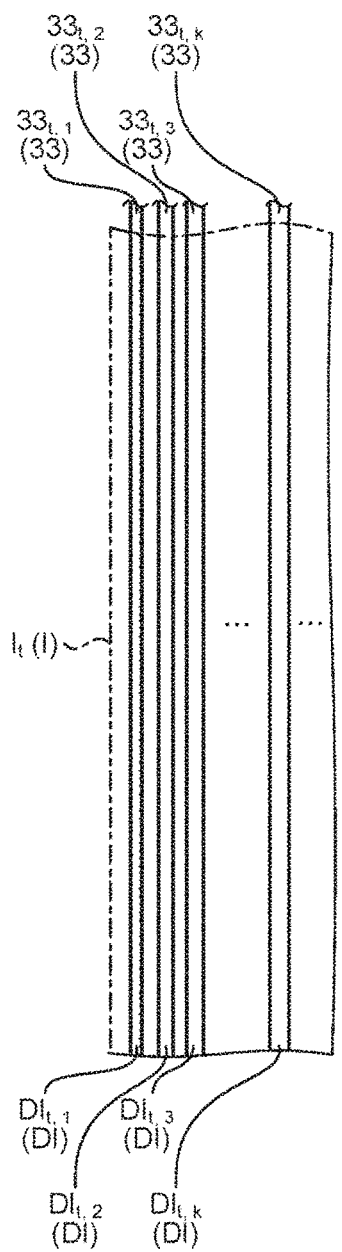
FIG. 14 is a diagram to describe a structure of a sub illumination region according to a second embodiment.

FIG. 14 is a diagram to describe a structure of a sub illumination region I according to a second embodiment. Components in the present embodiment common to those of the first embodiment are denoted with the same reference numerals, and detailed description is omitted.

The present embodiment differs from the first embodiment in that the widths of the respective first electrodes 33 provided in the same sub illumination region I are different from each other in each divided sub illumination region DI. In the present embodiment, all the widths of the respective first electrodes 33 included in the same divided sub illumination region DI are equal to each other. The width of the first electrode 33 included in one of the divided sub illumination region DI is different from that of the first electrode 33 included in another one of the divided sub illumination region DI. The width of the first electrodes 33 increases in an order of $33_{t,1}$, $33_{t,2}$, $33_{t,3}$, ..., and $33_{t,k}$.

For example, when the scan drive is performed, the backlight controlling unit 44 illustrated in FIG. 2 sets the position and the number of divided sub illumination regions DI to be selected according to a light quantity of illumination light to be emitted from the sub illumination region I.

When the light quantity of the illumination light to be emitted from the sub illumination region I is smaller than a first threshold, the backlight controlling unit 44 controls a polymer dispersion type liquid crystal panel 4 so that only a divided sub illumination region $DI_1$ where the first electrode 33 having the smallest width is provided from among the plurality of divided sub illumination regions DI provided in the sub illumination region I is in a scattering state. In this case, since a light emitting area becomes the smallest, a time for applying a voltage to a liquid crystal layer 35 is lengthened. According to this, illumination can be performed in a state where the liquid crystal layer 35 is sufficiently oriented. Therefore, even when the light quantity of the illumination light to be emitted from the sub illumination region I is very small, a target light quantity of the illumination light is easily obtained.

When the light quantity of the illumination light to be emitted from the sub illumination region I is larger than a second threshold, the backlight controlling unit 44 controls the polymer dispersion type liquid crystal panel 4 so that two or more divided sub illumination regions DI of the plurality of divided sub illumination regions DI provided in the sub illumination region I are in the scattering state. When the light quantity of the illumination light to be emitted from the sub illumination region I is larger than a third threshold, the backlight controlling unit 44 controls the polymer dispersion type liquid crystal panel 4 so that all the divided sub illumination regions DI provided in the sub illumination region I are in the scattering state. Accordingly, the light quantity of the illumination light to be emitted from the sub illumination region I can be finely adjusted.

Third Embodiment

Figure 15:
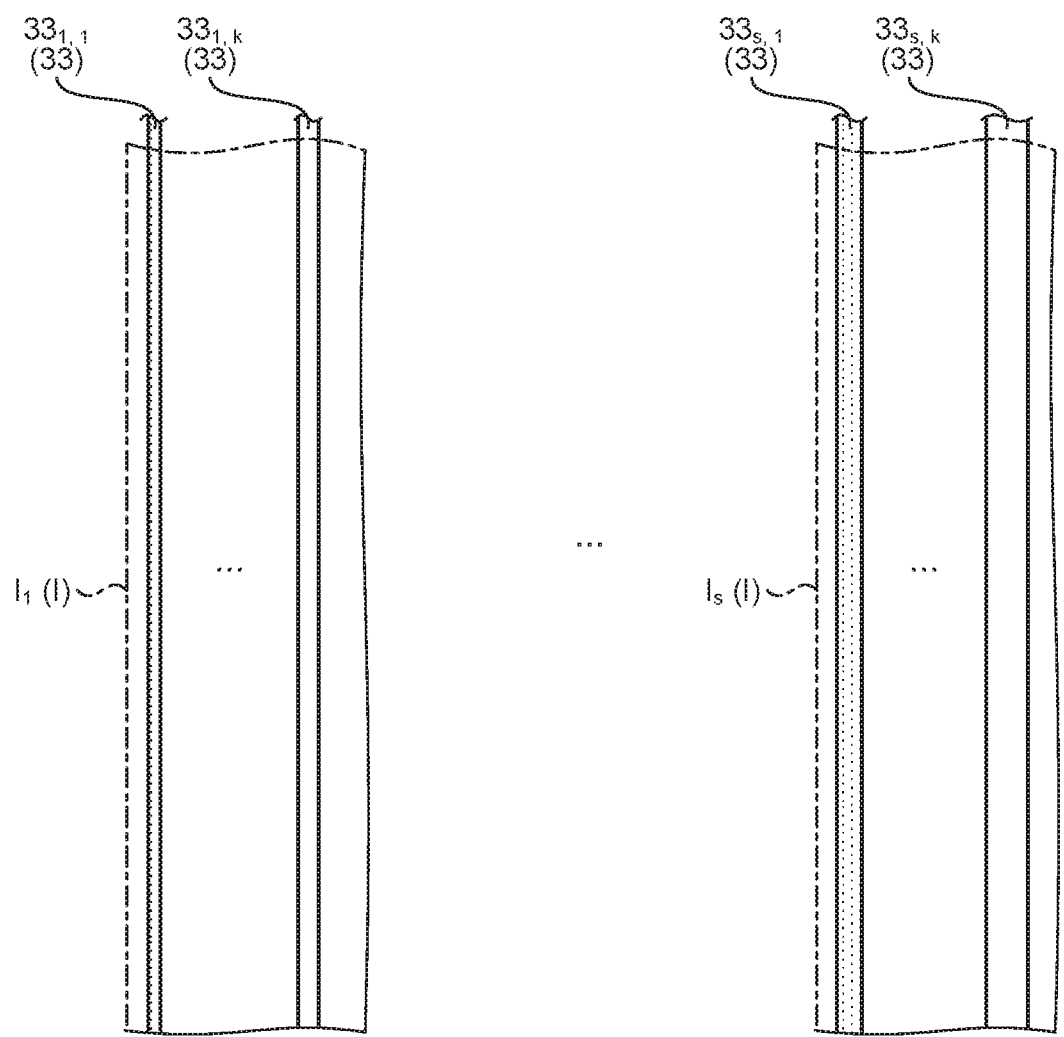
FIG. 15 is a diagram to describe a structure of a sub illumination region according to a third embodiment.

FIG. 15 is a diagram to describe a structure of a sub illumination region I according to a third embodiment. Components in the present embodiment common to those of the second embodiment are denoted with the same reference numerals, and detailed description is omitted.

The present embodiment differs from the first and second embodiments in that the width of a first electrode 33 included in the sub illumination region I is different according to a distance between a first end face 3a (refer to FIG. 3) and the sub illumination region I. In the present embodiment, the closer to the first end face 3a the sub illumination region I is, the smaller the width of the first electrode 33 included in the sub illumination region I is.

For example, the width of a first electrode $33_{1,1}$ which has the shortest width in the plurality of first electrodes 33 provided in the sub illumination region I1 closest to the first end face 3a is shorter than the width of the first electrode $33_{s,1}$ which has the shortest width in the plurality of first electrodes 33 provided in the sub illumination region Is farthest from the first end face 3a. Alternatively, for example, the width of a first electrode $33_{1,k}$ which has the longest width in the plurality of first electrodes 33 provided in the sub illumination region I1 closest to the first end face 3a is shorter than that of the first electrode $33_{s,k}$ which has the longest width in the plurality of first electrodes 33 provided in the sub illumination region Is farthest from the first end face 3a. The total width of the plurality of first electrodes 33 provided in the sub illumination region I1 closest to the first end face 3a (total value of the widths of first electrodes 33) is shorter than that of the plurality of first electrodes 33 provided in the sub illumination region Is farthest from the first end face 3a.

With this structure, a light emitting area can be differentiated according to the distance from the first end face 3a (refer to FIG. 3). Therefore, when the static drive is performed, the longer the distance between the sub illumination region I and the first end face 3a is, the larger the scattering of the sub illumination region I is. The light quantity of the illumination light in an illumination region 4A is uniformized.

The closer to the first end face 3a the sub illumination region I is, the shorter the total width of the first electrodes 33 is. Therefore, the light quantity of the illumination light absorbed by the first electrode 33 gets smaller at the position close to the first end face 3a, and a large amount of the illumination light reaches the sub illumination region I far from the first end face 3a.

Figure 16:
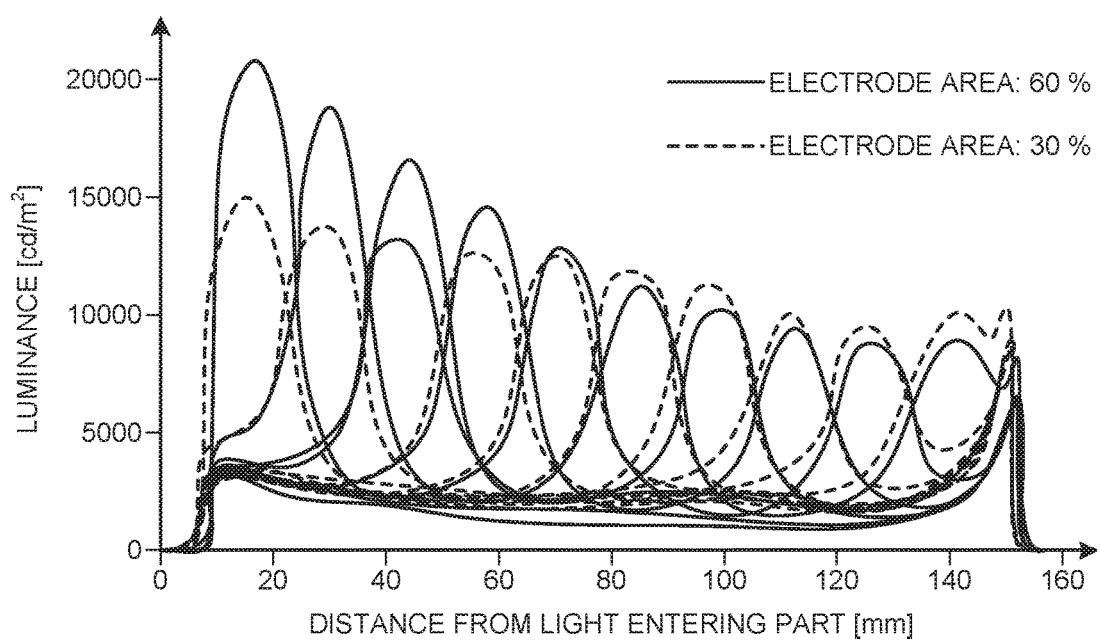
FIG. 16 a diagram in which a relation between a distance from a light entering part and a luminance of an illumination region is plotted on a relation with an electrode area.

For example, in FIG. 16, it is assumed that a ratio between an area of a single sub illumination region I and a total area of the first electrodes 33 included in the single sub illumination region I is an electrode area. FIG. 16 is a diagram in which a relation between a distance from a light entering part and a luminance (the light quantity of the illumination light) of an illumination region is plotted on a relation with the electrode area. All the sub illumination regions have equal electrode areas.

As illustrated in FIG. 16, the luminance of the illumination region is largely changed according to the electrode area. The larger the electrode area is, the larger a difference between the luminance in the illumination region at a position close to the light entering part and that at a position far from the light entering part is. Therefore, it is preferable to reduce the electrode area. However, when the electrode areas in all the sub illumination regions are equally reduced, there is a possibility that the light quantity of the illumination light emitted from the sub illumination region far from the light entering part is not sufficient in a case where the static drive is performed. As in the present embodiment, when the width of the first electrode in the sub illumination region near the light entering part is selectively reduced, these problems can be prevented.

The preferred embodiments of the present invention have been described above. However, the present invention is not limited to the embodiments. The content disclosed in the embodiments are only exemplary and can be variously changed without departing from the scope of the present invention. Various changes performed without departing from the scope of the present invention belong to the technical scope of the present invention.

The present invention can be widely applied to a display device according to the aspects below.

A display device comprising:
a polymer dispersion type liquid crystal panel;
a light source device configured to emit illumination light that is incident to an end face of the polymer dispersion type liquid crystal panel; and
a display panel configured to modulate the illumination light which propagates through the polymer dispersion type liquid crystal panel and is dispersed by the polymer dispersion type liquid crystal panel, wherein
the polymer dispersion type liquid crystal panel includes a plurality of sub illumination regions, in which, switching between a scattering state where the illumination light is scattered and a non-scattering state where the illumination light is not scattered, are independently controlled by applying a voltage to a liquid crystal layer,
in the sub illumination region, a plurality of first electrodes for applying the voltage to the liquid crystal layer are aligned,
the plurality of first electrodes are respectively divided into a plurality of groups in which every or a plurality of first electrodes are electrically connected each other, and
the sub illumination region includes a plurality of divided sub illumination regions, in which the switching between the scattering state and the non-scattering state are independently controlled, corresponding to the plurality of groups.

(2) The display device according to (1), further comprising
an illumination device controlling unit configured to select one or a plurality of divided sub illumination regions from among the divided sub illumination regions for each sub illumination region and differentiate time for applying the voltage to the liquid crystal layer according to the number of selected divided sub illumination regions.

(3) The display device according to (2), wherein
the smaller the number of selected divided sub illumination regions is, the longer the time for applying the voltage to the liquid crystal layer is.

(4) The display device according to (2) or (3),
wherein the illumination device controlling unit sets a light quantity of illumination light to be emitted from the sub illumination region,
wherein the illumination device controlling unit calculates the time for applying the voltage to the liquid crystal layer necessary for obtaining the light quantity when illumination is performed as changing states of all the divided sub illumination regions in the sub illumination region to the scattering state as a target time, and wherein the illumination device controlling unit controls the polymer dispersion type liquid crystal panel so that the divided sub illumination regions, of which the number is smaller than that of the divided sub illumination regions provided in the sub illumination region, are in the scattering state in a case where the target time is equal to or shorter than a time from application of the voltage to the liquid crystal layer to completion of orientation change of the liquid crystal layer.

(5) The display device according to any one of (2) to (4), wherein
all the widths of the respective first electrodes included in the same divided sub illumination region are equal to each other, and
the width of the first electrode included in one of the divided sub illumination region is different from that of the first electrode included in another one of the divided sub illumination region.

(6) The display device according to (5), wherein
the illumination device controlling unit controls the polymer dispersion type liquid crystal panel so that only the divided sub illumination region where the first electrode having the smallest width is provided from among the plurality of divided sub illumination regions provided in the sub illumination region is in the scattering state when the light quantity of the illumination light to be emitted from the sub illumination region is smaller than a first threshold.

(7) The display device according to (5) or (6), wherein
the illumination device controlling unit controls the polymer dispersion type liquid crystal panel so that two or more divided sub illumination regions from among the plurality of divided sub illumination regions provided in the sub illumination region are in the scattering state when the light quantity of the illumination light to be emitted from the sub illumination region is larger than a second threshold.

(8) The display device according to any one of (5) to (7), wherein
the illumination device controlling unit controls the polymer dispersion type liquid crystal panel so that all the divided sub illumination regions provided in the sub illumination region are in the scattering state when the light quantity of the illumination light to be emitted from the sub illumination region is larger than a third threshold.

(9) The display device according to any one of (1) to (4), wherein
the plurality of sub illumination regions are aligned from a side close to the end face to a side far from the end face, and
the width of the first electrode which has the shortest width in the plurality of first electrodes provided in the sub illumination region closest to the end face is shorter than the width of the first electrode which has the shortest width in the plurality of first electrodes provided in the sub illumination region farthest from the end face.

(10) The display device according to (9), wherein
a total width of the plurality of first electrodes provided in the sub illumination region closest to the end face is shorter than that of the plurality of first electrodes provided in the sub illumination region farthest from the end face.

(11) The display device according to (1), wherein
all the widths of the respective first electrodes included in the same divided sub illumination region are equal to each other, and the width of the first electrode included in the divided sub illumination region is different from that of the first electrode included in the different divided sub illumination region.

(12) An illumination device comprising:
a polymer dispersion type liquid crystal panel; and
a light source device configured to emit illumination light that is incident to an end face of the polymer dispersion type liquid crystal panel, wherein
the polymer dispersion type liquid crystal panel includes a plurality of sub illumination regions, in which, switching between a scattering state where the illumination light is scattered and a non-scattering state where the illumination light is not scattered, are independently controlled by applying a voltage to a liquid crystal layer,
in the sub illumination region, a plurality of first electrodes for applying the voltage to the liquid crystal layer are aligned,
the plurality of first electrodes are respectively divided into a plurality of groups in which every or a plurality of first electrodes are electrically connected each other, and
the sub illumination region includes a plurality of divided sub illumination regions, in which the switching between the scattering state and the non-scattering state are independently controlled, corresponding to the plurality of groups.

(13) The illumination device according to (12), wherein one or a plurality of divided sub illumination regions are selected from among the divided sub illumination regions for each sub illumination region, and time for applying the voltage to the liquid crystal layer is different according to the number of selected divided sub illumination regions.

(14) The illumination device according to (13), wherein the smaller the number of selected divided sub illumination regions is, the longer the time for applying the voltage to the liquid crystal layer is.

(15) The illumination device according to (13) or (14), wherein a light quantity of illumination light to be emitted from the sub illumination region is set,
wherein the time for applying the voltage to the liquid crystal layer necessary for obtaining the light quantity when illumination is performed as changing states of all the divided sub illumination regions in the sub illumination region to the scattering state is calculated as a target time, and
wherein the polymer dispersion type liquid crystal panel is controlled so that the divided sub illumination regions, of which the number is smaller than that of the divided sub illumination regions provided in the sub illumination region, are in the scattering state in a case where the target time is equal to or shorter than time from application of the voltage to the liquid crystal layer to completion of orientation change of the liquid crystal layer.

(16) The illumination device according to any one of (13) to (15), wherein
all the widths of the respective first electrodes included in the same divided sub illumination region are equal to each other, and
the width of the first electrode included in one of the divided sub illumination region is different from that of the first electrode included in another one of the divided sub illumination region.

(17) The illumination device according to (16), wherein the polymer dispersion type liquid crystal panel is controlled so that only the divided sub illumination region where the first electrode having the shortest width is provided from among the plurality of divided sub illumination regions provided in the sub illumination region is in the scattering state when the light quantity of the illumination light to be emitted from the sub illumination region is smaller than a first threshold.

(18) The illumination device according to (16) or (17), wherein
the polymer dispersion type liquid crystal panel is controlled so that two or more divided sub illumination regions from among the plurality of divided sub illumination regions provided in the sub illumination region are in the scattering state when the light quantity of the illumination light to be emitted from the sub illumination region is larger than a second threshold.

(19) The illumination device according to any one of (16) to (18), wherein
the polymer dispersion type liquid crystal panel is controlled so that all the divided sub illumination regions provided in the sub illumination region are in the scattering state when the light quantity of the illumination light to be emitted from the sub illumination region is larger than a third threshold.

(20) The illumination device according to any one of (12) to (15), wherein
the plurality of sub illumination regions are aligned from a side close to the end face to a side far from the end face, and
the width of the first electrode which has the smallest width in the plurality of first electrodes provided in the sub illumination region closest to the end face is smaller than the width of the first electrode which has the smallest width in the plurality of first electrodes provided in the sub illumination region farthest from the end face.

(21) The illumination device according to (20), wherein a total width of the plurality of first electrodes provided in the sub illumination region closest to the end face is smaller than that of the plurality of first electrodes provided in the sub illumination region farthest from the end face.

(22) The illumination device according to (12), wherein all widths of the first electrodes included in the same divided sub illumination region are equal to each other, and the width of the first electrode included in the divided sub illumination region is different from that of the first electrode included in the different divided sub illumination region.

What is claimed is:
1. A display device comprising:
a polymer dispersion type liquid crystal panel;
a light source device configured to emit illumination light that is incident to an end face of the polymer dispersion type liquid crystal panel;
a display panel configured to modulate the illumination light which propagates through the polymer dispersion type liquid crystal panel and is dispersed by the polymer dispersion type liquid crystal panel; and
an illumination device controlling unit,
wherein
the polymer dispersion type liquid crystal panel includes a plurality of sub illumination regions, in which, switching between a scattering state where the illumination light is scattered and a non-scattering state where the illumination light is not scattered, are independently controlled by applying a voltage to a liquid crystal layer,
in the sub illumination region, a plurality of first electrodes for applying the voltage to the liquid crystal layer are aligned,
the plurality of first electrodes are respectively divided into a plurality of groups in which every or a plurality of first electrodes are electrically connected each other,
the sub illumination region includes a plurality of divided sub illumination regions, in which the switching between the scattering state and the non-scattering state are independently controlled, corresponding to the plurality of groups, and the illumination device controlling unit is configured to select one or a plurality of divided sub illumination regions from among the divided sub illumination regions for each sub illumination region and differentiate time for applying the voltage to the liquid crystal layer according to the number of selected divided sub illumination regions.

2. The display device according to claim 1, wherein the smaller the number of selected divided sub illumination regions is, the longer the time for applying the voltage to the liquid crystal layer is.

3. The display device according to claim 1,
wherein the illumination device controlling unit sets a light quantity of illumination light to be emitted from the sub illumination region,
wherein the illumination device controlling unit calculates the time for applying the voltage to the liquid crystal layer necessary for obtaining the light quantity when illumination is performed as changing states of all the divided sub illumination regions in the sub illumination region to the scattering state as a target time, and
wherein the illumination device controlling unit controls the polymer dispersion type liquid crystal panel so that the divided sub illumination regions, of which the number is smaller than that of the divided sub illumination regions provided in the sub illumination region, are in the scattering state in a case where the target time is equal to or shorter than a time from application of the voltage to the liquid crystal layer to completion of orientation change of the liquid crystal layer.

4. The display device according to claim 1, wherein all the widths of the respective first electrodes included in the same divided sub illumination region are equal to each other, and
the width of the first electrode included in one of the divided sub illumination region is different from that of the first electrode included in another one of the divided sub illumination region.

5. The display device according to claim 4, wherein the illumination device controlling unit controls the polymer dispersion type liquid crystal panel so that only the divided sub illumination region where the first electrode having the smallest width is provided from among the plurality of divided sub illumination regions provided in the sub illumination region is in the scattering state when the light quantity of the illumination light to be emitted from the sub illumination region is smaller than a first threshold.

6. The display device according to claim 4, wherein the illumination device controlling unit controls the polymer dispersion type liquid crystal panel so that two or more divided sub illumination regions from among the plurality of divided sub illumination regions provided in the sub illumination region are in the scattering state when the light quantity of the illumination light to be emitted from the sub illumination region is larger than a second threshold.

7. The display device according to claim 4, wherein the illumination device controlling unit controls the polymer dispersion type liquid crystal panel so that all the divided sub illumination regions provided in the sub illumination region are in the scattering state when the light quantity of the illumination light to be emitted from the sub illumination region is larger than a third threshold.

8. The display device according to claim 1, wherein the plurality of sub illumination regions are aligned from a side close to the end face to a side far from the end face, and
the width of the first electrode which has the shortest width in the plurality of first electrodes provided in the sub illumination region closest to the end face is shorter than the width of the first electrode which has the shortest width in the plurality of first electrodes provided in the sub illumination region farthest from the end face.

9. The display device according to claim 8, wherein a total width of the plurality of first electrodes provided in the sub illumination region closest to the end face is shorter than that of the plurality of first electrodes provided in the sub illumination region farthest from the end face.

10. The display device according to claim 1, wherein all the widths of the respective first electrodes included in the same divided sub illumination region are equal to each other, and the width of the first electrode included in the divided sub illumination region is different from that of the first electrode included in the different divided sub illumination region.

11. An illumination device comprising:
a polymer dispersion type liquid crystal panel; and
a light source device configured to emit illumination light that is incident to an end face of the polymer dispersion type liquid crystal panel; and
an illumination device controlling unit, wherein
the polymer dispersion type liquid crystal panel includes a plurality of sub illumination regions, in which, switching between a scattering state where the illumination light is scattered and a non-scattering state where the illumination light is not scattered, are independently controlled by applying a voltage to a liquid crystal layer,
in the sub illumination region, a plurality of first electrodes for applying the voltage to the liquid crystal layer are aligned,
the plurality of first electrodes are respectively divided into a plurality of groups in which every or a plurality of first electrodes are electrically connected each other, and
the sub illumination region includes a plurality of divided sub illumination regions, in which the switching between the scattering state and the non-scattering state are independently controlled, corresponding to the plurality of groups, and
the illumination device controlling unit is configured to select one or a plurality of divided sub illumination regions from among the divided sub illumination regions for each sub illumination region and differentiate time for applying the voltage to the liquid crystal layer according to the number of selected divided sub illumination regions.

12. The illumination device according to claim 11, wherein
the smaller the number of selected divided sub illumination regions is, the longer the time for applying the voltage to the liquid crystal layer is.

13. The illumination device according to claim 11, wherein a light quantity of illumination light to be emitted from the sub illumination region is set, wherein the time for applying the voltage to the liquid crystal layer necessary for obtaining the light quantity when illumination is performed as changing states of all the divided sub illumination regions in the sub illumination region to the scattering state is calculated as a target time, and wherein the polymer dispersion type liquid crystal panel is controlled so that the divided sub illumination regions, of which the number is smaller than that of the divided sub illumination regions provided in the sub illumination region, are in the scattering state in a case where the target time is equal to or shorter than time from application of the voltage to the liquid crystal layer to completion of orientation change of the liquid crystal layer.

14. The illumination device according to claim 11, wherein all the widths of the respective first electrodes included in the same divided sub illumination region are equal to each other, and the width of the first electrode included in one of the divided sub illumination region is different from that of the first electrode included in another one of the divided sub illumination region.

15. The illumination device according to claim 14, wherein the polymer dispersion type liquid crystal panel is controlled so that only the divided sub illumination region where the first electrode having the shortest width is provided from among the plurality of divided sub illumination regions provided in the sub illumination region is in the scattering state when the light quantity of the illumination light to be emitted from the sub illumination region is smaller than a first threshold.

16. The illumination device according to claim 14, wherein the polymer dispersion type liquid crystal panel is controlled so that two or more divided sub illumination regions from among the plurality of divided sub illumination regions provided in the sub illumination region are in the scattering state when the light quantity of the illumination light to be emitted from the sub illumination region is larger than a second threshold.

17. The illumination device according to claim 14, wherein the polymer dispersion type liquid crystal panel is controlled so that all the divided sub illumination regions provided in the sub illumination region are in the scattering state when the light quantity of the illumination light to be emitted from the sub illumination region is larger than a third threshold.

* * * * *